United States Patent [19]
DiPoto

[11] Patent Number: 5,558,930
[45] Date of Patent: Sep. 24, 1996

[54] HEAT SEALABLE, HIGH MOISTURE BARRIER FILM AND METHOD OF MAKING SAME

[75] Inventor: James P. DiPoto, Terre Haute, Ind.

[73] Assignee: Tredegar Industries, Inc., Richmond, Va.

[21] Appl. No.: 264,564

[22] Filed: Jun. 23, 1994

[51] Int. Cl.⁶ .................................................. B32D 7/02
[52] U.S. Cl. ................... 428/216; 428/214; 428/349; 428/515; 428/516; 428/518; 428/520
[58] Field of Search ........................ 428/349, 910, 428/516, 518, 520, 216, 214

[56] References Cited

U.S. PATENT DOCUMENTS

| | | | |
|---|---|---|---|
| 4,228,215 | 10/1980 | Hein III et al. | 428/216 |
| 4,247,584 | 1/1981 | Widiger et al. | 428/35 |
| 5,241,030 | 8/1993 | Barry et al. | 428/910 |

*Primary Examiner*—Edith Buffalow
*Attorney, Agent, or Firm*—Emch, Schaffer, Schaub & Porcello Co., L.P.A.

[57] ABSTRACT

The present invention provides a multi-layer heat sealable film which is produced by coextrusion and compression rolled orientation. The film comprises at least one barrier layer of a moisture and/or gas resistant thermoplastic material and at least one sealant layer of a heat sealable thermoplastic material.

41 Claims, 3 Drawing Sheets

HEAT SEALABLE, HIGH MOISTURE BARRIER FILM AND METHOD OF MAKING SAME

TECHNICAL FIELD

This invention relates to a heat sealable, high moisture barrier film produced by coextrusion and compression rolled orientation.

BACKGROUND OF THE INVENTION

Many items are packaged today, primarily in the area of foods, where it is vitally important to maintain the proper level of moisture content within the packaged item. For example, if a popcorn kernel becomes too dry, it will not pop in the microwave oven; and if a cracker or cereal becomes too moist, it may lose its appeal to the customer. For this reason, the moisture vapor transmission rate (MVTR) of the material used to construct such packages is critical.

One of the first packaging materials attempting to solve this need was wax coated paper. Cellulosic films also were used early on. Later synthetic polymers were developed and films such as polyethylene were commonly used. As the demands grew, it was discovered that orienting polymer films improved the moisture barrier property. Today, oriented polypropylene films are very common as packaging materials.

The most common orienting methods are to stretch it in one direction (uniaxial orientation) or two directions (biaxial orientation). One "stretching" technology is called "tentering" and involves machinery which literally grabs the film and stretches it. With oriented polypropylene films, it was found that biaxial orientation provides an increase in barrier properties and yields a film with greater tensile strength in both machine and transverse directions, as well as excellent optical clarity; hence, it is the most commonly practiced technology today.

Another means of orienting films was disclosed in Great Britain, Jan. 13, 1965, U.S. Pat. No. 980,260, by Kodak Limited. This art was called "compression rolling orientation" (CRO).

Whatever the means of orientation used, once the film is created with an adequate MVTR value, it must then be made into the form and embodiment of the desired package, most usually a bag. To form the bag, one must be able to seal the film to itself. The most common means for sealing is "heat sealing".

Many kinds of machinery have been constructed for the purpose of forming the bags while simultaneously filling them with the desired content. These are typically known as vertical form fill and seal and horizontal form fill and seal machines. The reference as to their horizontal or vertical attitude is related to the attitude at which the film is introduced.

These machines typically have forming collars or bars that shape a flat piece of film into the more tubular shape of the bag, then actuate hot metal sealing jaws from an open position to a closed position, contacting the film in order to seal it into its bag-shape. It is most often very important for the outside of the film, which comes in direct contact with hot metal surface of the sealing jaws, to have a higher melting temperature than the inside of the film. The heat can transfer through the outside of the film to melt and fuse the inner, sealant side to form the seal. When the jaws reopen, the outside, which has not melted, is not stuck to the sealing jaws. Since one polymeric material cannot have two diverse melting points, a two-ply or two layer film is used.

Two-ply materials are commonly made using lamination technology, wherein a film of barrier material is laminated to a film of sealant material via any of several means. Solvent based adhesive laminations are common, as are water based adhesive laminations. Thermal, sonic or radio frequency bonding can also be utilized. In blown or cast films, coextrusion technology is common. However, these films, if unoriented, can not provide the same MVTR barrier as oriented films unless they are much thicker.

Another technology used is extrusion coating, where a sealant polymer is generally extruded onto a barrier film and adheres because it is molten. Emulsion coating of barrier films with sealant materials is also known.

All of the aforementioned methods of providing a heat sealable barrier film, except for coextrusion, are done as secondary operations. Additionally, the methods where solvents are needed introduce the problem of solvent emissions. Therefore, a continuous method is desired, wherein coextrusion provides the base material and orientation follows in a single operation.

It is the object of the present invention to provide a multi-layer heat sealable, high moisture barrier film and method and apparatus for the production of such film.

By use of the apparatus of the present invention, one or two-side heat sealable film structures are capable of being produced. The heat sealable film made from the present invention shows high moisture barrier properties, and can provide excellent gas barrier properties as well.

DESCRIPTION OF THE INVENTION

The present invention provides a unique process for producing multi-layer coextruded films comprising dissimilar polymers. Surprisingly, the inventor discovered that it was possible to compression roll at the lower temperatures required to orient the low melting point sealants. Compression rolling is a solid-state contact orientation process. As such, the mill roll surface temperature is lowered to orient an input film(s) having a low melting point sealant polymer contacting at least one mill roll. Normally, these lower temperatures result in less orientation (thickness reduction) and consequently less desirable moisture barrier performance. Surprisingly, the inventor discovered that even at the lower mill roll surface temperature required to avoid melting the sealant polymer, orientation (thickness reduction) ratios of 6:1 or more were possible.

Also, it was discovered that sealant polymers could be produced with adequate levels of dimensional stability (resistance to shrinkage in use) by annealing after orientation at the required lower temperatures for longer than normal time periods.

A new film is created by coextruding at least one barrier material such as a high melting point polymer (for example, a high density polyethylene homopolymer) with at least one adhesive or sealant material such as a lower melting point polymer (for example, ethylene vinyl acetate polymer) and orienting the coextruded materials by compression rolled orientation. The coextrusion of the multi-layer film may utilize cast film, cast sheet, or blown film systems. Until the present invention, there has not been a coextruded multi-layer film comprising at least one heat sealable polymer and at least one barrier polymer layer which is compression roll oriented.

According to one embodiment, a multi-layer coextrusion system is used to create a blown tube with a lower melting point polymer on the outside of the tube and a higher melting point polymer on the inside of the tube. The tube is collapsed to form a two-ply material. The collapsed tube thus comprises in this order: first sealant layer, first barrier material, second barrier material and second sealant layer. The collapsed tube is then transported to a compression rolled orientation mill.

Another aspect of the present invention relates to a blown one-side heat sealable film produced in a similar manner, wherein after formation of the tube as described above having two-plies or webs, the tube is slit and one side or web of the tube is inverted before the two webs are transported into a compression mill. This film places a heat sealable layer inside the film structure, such that the finished film structure has the following layers: heat sealable polymer, high melting point barrier polymer, heat sealable polymer, high melting point barrier polymer.

BRIEF DESCRIPTION OF THE DRAWINGS

FIG. 10 is a simplified schematic drawing of a coextruded, compression rolled orientation method using a sheet extrusion casting process.

FIG. 11 is a cross-sectional view of a three-layer, two-ply, single-side heat sealable compression rolled film having a sealant layer as one outer surface of the film, and a barrier layer as the other outer surface.

FIG. 12 is a cross-sectional view of another embodiment of a five-layer, two-ply, heat sealable compression rolled film, having moisture and gas barrier properties.

FIG. 13 is a cross-sectional view of yet another embodiment of a six-layer, two-ply, heat sealable compression rolled film having moisture and gas barrier properties.

BEST MODE OF CARRYING OUT INVENTION

Films produced for bag-in-box moisture barrier packaging applications are typically produced by the blown coextrusion manufacturing method. The most common materials are high density polyethylene (HDPE) for the barrier layer and ethylene vinyl acetate (EVA) copolymers for the sealant layers.

According to the present invention, a film is provided which has improved moisture barrier properties due to compression rolling that also has heat sealable functionality due to the presence of a low melting point sealant layer.

It is now possible to make heat sealable film having equivalent or better barrier properties compared to conventionally produced blown coextrusions by using the coextruded compression rolled orientation method of the present invention. The compression rolled orientation process provides the ability to down gauge the film to provide thinner films with improved moisture barrier which is not possible using other methods. Further, when a sealant layer is incorporated as a layer in the film, the film can be oriented at higher thickness reduction ratios.

Further, in the multi-layer sealable film, the sealant or adhesive layer helps provide puncture resistance. It is also within the contemplated scope of the present invention that various other materials can be included as an intermediate layer in the film. The various intermediate or middle layers can be provided to increase the desired properties of the film such as puncture resistance, tear resistance, opacity level and gas barrier properties. These various intermediate materials can include other types of barrier materials such as gas barrier materials, other sealant layers, metallic particles layers, and layers which include trim or excess from the film material. It is also contemplated that a color component (such as titanium dioxide) can be added to render any desired level of opacity or color to the film.

The present invention provides a multi-layer film and a process for simultaneously milling both soft and stiff polymers to form a high barrier multi-layer film. In certain embodiments, it is desirable to have a sealant layer as an inner surface of the film, as well as on the outer surface. The sealant layer is typically a thinner layer than other layers of the multi-layer film.

Figure 1:
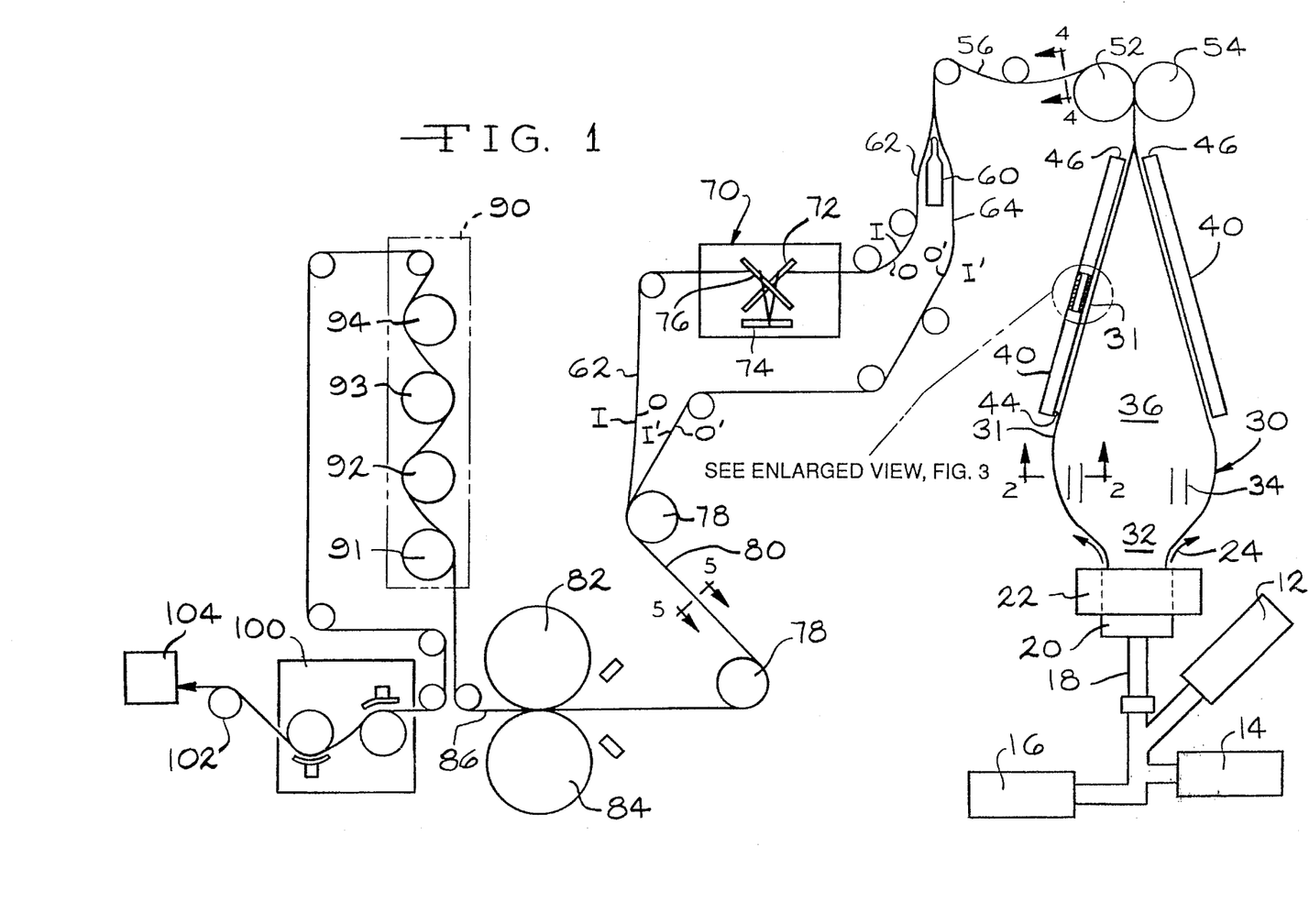
FIG. 1 is a simplified schematic plan view of a coextruded, compression rolled orientation method using a blown film process.

One preferred method for making the film of the present invention is shown in FIG. 1. It is to be understood that other multi-layer films can be produced according to the method of the present invention and that the following description is merely illustrative.

The present invention provides a multi-layer film comprises two or more layers of film. A first layer is a barrier layer which comprises a gas and/or moisture barrier material, such as high density polyethylene (HDPE), medium density polyethylene (MDPE), low density polyethylene (LDPE), linear polyethylenes such as butene, hexene, octene copolymers, polypropylene, nylon, ethylene vinyl alcohol (EVOH), polyester, polyacrylonitrile, polyvinylidene chloride (PvDC) and blends thereof. The barrier layer is comprised of a material which has a higher melting point than the sealant layer. In various embodiments, it is preferred to have high density polyethylene as a primary component of the barrier layer. The second layer is a heat sealant layer which can comprise a material having various heat seal layer properties such as seal initiation temperature, hot tack strength and coefficient of friction. Various useful adhesive or heat sealant layers comprise ethylene vinyl acetate copolymers (EVA), ethylene methyl acrylate copolymers (EMA), butene, hexene, octene linear copolymers of polyethylene, ethylene acrylic acid copolymer (EAA), ethylene methacrylic acid (EMAA) copolymers (such as Nucrel®), hexene-butene copolymers, ionomers such as Surlyn®, acid and anhydride modified ethylene vinyl acetates such as Bynel®, medium density polyethylene (MDPE), low density polyethylene (LDPE), ultra low density polyethylene (ULDPE), very low density polyethylene (VLDPE), linear polyethylenes, and metallocene catalyst based polyethylenes which are copolymerized with 10–20% octene, hexene, butene or mixtures thereof, and blends of these adhesive layer materials. In various embodiments, the EVA copolymers are preferred as adhesive layers. Typically, it is noted that heat sealant layers have lower melting points than barrier layers such as high density polyethylene. The heat sealant layer is tacky and tends to adhere to itself and other materials.

Various other ingredients such as slip agents can be incorporated into the film layers of the present invention. One preferred slip agent comprises erucamide or stearamide ranging from about 0–2500 ppm and preferably about 250–750 ppm, and oleyl palmitamide ranging from about 0–2500 ppm and preferably about 1000–2000 ppm. It is to be understood that various other ingredients and slip agents or coefficient of friction reducing agents are useful in the film of the present invention.

The present invention provides film thicknesses ranging from about 0.30 mil to about 4.00–5.00 mil. The preferred film ranges from about 0.75 mil to about 2.0 mil and most preferably from about 1.00 to about 1.60 mil. The sealant layers preferably comprise about 2.5 to about 80% of the total thickness of the film. The film of the present invention in embodiments where there are two or more sealant layers, it is preferred that each sealant layer ranges from about 2.5% to about 40% based on the total thickness of the film. The most preferred thickness layer of each sealant layer ranges from about 8 to about 18% and certain embodiments is preferred to be about 12.5%. It is to be understood that in embodiments where the film is formed by a blown film method, the identical amount is contained in each web of the film, as will be understood readily by the following explanation.

Referring now to FIG. 1, each material which is to ultimately form a layer of the film is extruded from an extruder. In the embodiment shown in FIG. 1, three extruders, 12, 14 and 16 are shown. It is understood that either two or more extruders, including others not shown, can be utilized in order to make a multi-layer film of the present invention. With reference to FIGS. 2–5, it is understood that three extruders are used in order to make a multi-layer film described according to those figures. The extruded materials pass through a coextrusion adapter 18 and pass through a coextruder die 20. An air ring 22 forces cold air in the direction of the arrows 24 such that a blown film bubble 30 is formed. The temperature of the film is greater than the melting point of the coextruded materials at point 32, such that the film is molten. As the film cools, a frost line 34 occurs generally as shown with vertical lines. The film is quenched or cooled such that the temperature of the film drops and at point 36 the film is generally below the temperature of the recrystallization (Tc).

The frost line area 34 is determined by the amount of coolant air on the bubble 30, as well as melt temperatures exiting the die and polymer flow rate (pounds per hr.). The distance of the frost line 34 from the air ring 22 impacts the barrier properties of the film. The higher the frost line 34 or farther away from the air ring 22, the more crystalinity is imparted to the film. Also, when the frost line 34 is higher, the temperature drop of the molten materials is slower and the film spends more time at the maximum crystallization rate temperature (Tc) which also provides a higher density to the film. Higher density films yield better barrier properties in the final oriented film product. The lower the frost line 34, or closer to the air ring 22, the better thickness control for the film is possible.

Figure 2:
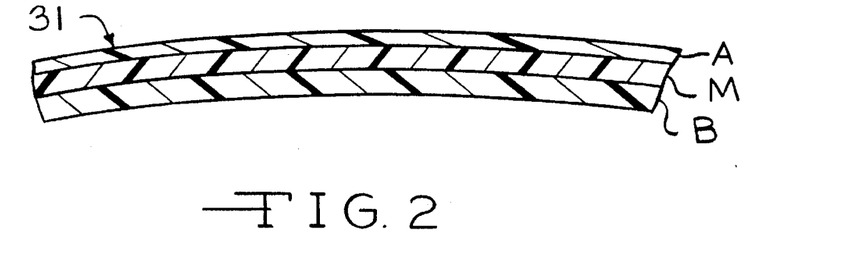
FIG. 2 is a cross-sectional view of the blown film tubing taken along the line 2—2 in FIG. 1.
Figure 3:
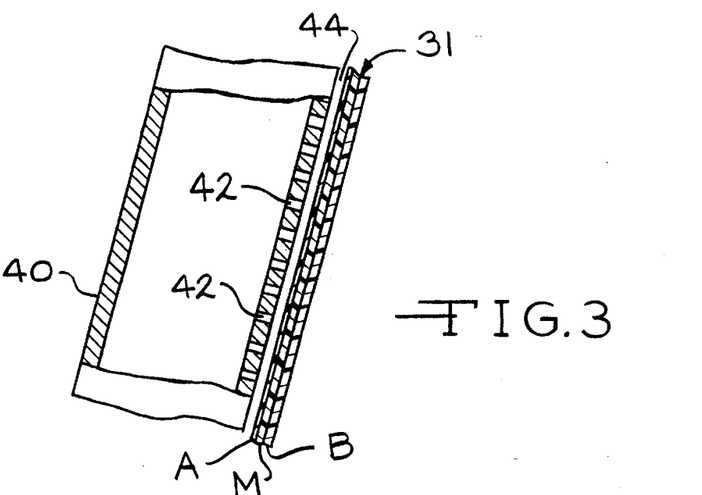
FIG. 3 is an enlarged, cross-sectional view of the area shown in FIG. 1 and is a depiction of the tubing near the air flotation flattener.

Referring now to FIG. 2, one-side of a multi-layer blown film bubble 30 is shown prior to collapse in the flattener.

The multi-layer film being extruded in FIG. 1 comprises an adhesive or sealant layer A, a barrier layer B and a middle or intermediate layer M. In various embodiments, the intermediate layer M can comprise barrier material and trim or scrap material from the film process. The adhesive layer A is on the outside of the bubble 30. Continuous portions of the bubble 30 pass by air flatteners 40. The air flatteners 40 contain a plurality of apertures 42 which allow air to flow from the air flattener 40 in the direction of the bubble 30. The air flatteners 40 provide internal pressure which is forced out through the apertures 42 to provide an air cushion 44 so that the bubble 30 slides on air. The adhesive or sealant layer A generally comprises materials having a high coefficient of friction. As shown in the enlargement in FIG. 3, a cushion of air 44 is provided by the air flowing through the apertures 42 such that the tacky adhesive layer A does not adhere to the air flatteners 40 or become wrinkled as the bubble 30 is being collapsed. The bubble 30 collapses at a point adjacent to the trailing edges 46 of the air flatteners 40 and collapses to form a two-ply or web material 56. The two-ply material 56 passes through squeeze rolls 52 and 54. In preferred embodiments, the squeeze roll 52 comprises a steel material, while the squeeze roll 54 comprises a rubber material on its surface.

Figure 4:
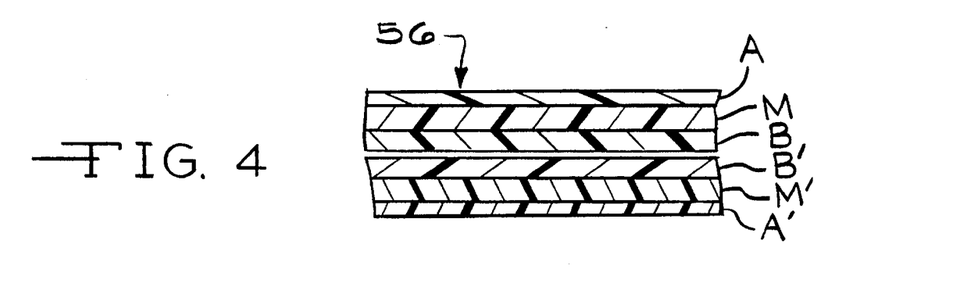
FIG. 4 is a cross-sectional view of the flattened tubing taken along the line 4—4 in FIG. 1.

Referring now to FIG. 4, a cross-section is taken along the lines 4—4 in FIG. 1. As seen in FIG. 4, the two-ply material 50 comprises in the following order the adhesive layer A, the intermediate layer M, the barrier layer B, the barrier layer B', the intermediate layer M' and the adhesive layer A'. The two plies are in contact with each other, but are not bonded or welded together.

The collapsed film shown in FIG. 4 proceeds to a web separating mechanism 60 which splits or separates the collapsed bubble into two webs 62 and 64. The first web 62 proceeds to a web inverter mechanism 70 such as those made by the Collier Coding Machinery Corporation of Greentown, Ohio which flips or turns the web 180°. This can be seen in FIG. 1 once the web separating mechanism 60 has separated the webs 62 and 64. The web 62 has an outside surface designated O and an inside surface designated I and the web 64 has an inside surface I' and an outside surface O'. In the embodiment shown, the web inverter mechanism 70 generally allows the web 62 to pass over a first bar 72 which turns the film 45°. The web 62 passes over a second bar 74 which turns the film 90° and passes over a third bar 76 which turns the web 62 another 45°. After the web 62 is inverted, the outside surface O of the web 62 is adjacent the inside surface I' of the web 64. The webs 62 and 64 are brought together by being pulled over at least one roll 78 to form a recombined web material 80.

Figure 5:
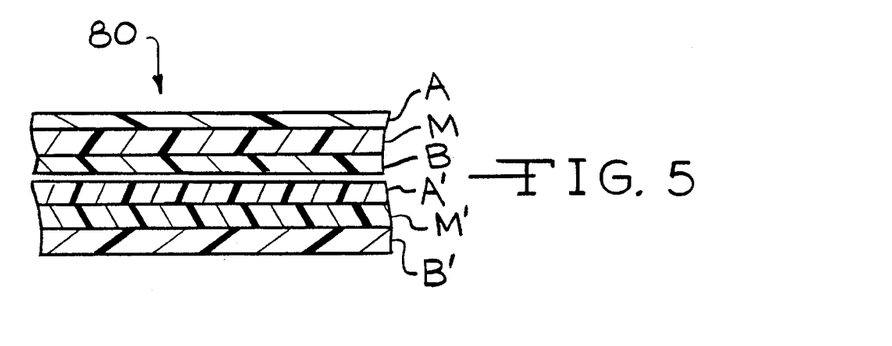
FIG. 5 is a cross-sectional view of the two webs after one-ply is inverted taken along the line 5—5 in FIG. 1.

Referring now to FIG. 5, the recombined multi-layer film is shown after passing through the web inverter mechanism 70. The recombined web comprises the following layers: first sealant layer A, first intermediate layer M, first barrier layer B, second sealant layer A', intermediate layer M' and second barrier layer B'. The interface between the first barrier layer B and second sealant layer A' is not welded together at this point, as is shown by a small area 81 present between the first barrier layer B and second sealant layer A'.

The recombined web 80 passes through a pair of compression rolled orientation milling rolls 82 and 84 which cause the webs 62 and 64 of the recombined web 80 to be bonded or welded together and form a multi-layer film 86.

During the compression rolled orientation of the multi-layer film, the two dissimilar polymers pass through the same heat, pressure, shear or extensional forces. It has surprisingly been found that the thinner lower melting point sealant layer of the thinner film is not compression rolled at a rate different from the thicker higher melting point barrier layer film. Until the present invention, no one has coextruded a multi-layer film comprising an adhesive layer and a barrier film and compression rolled both layers together. It has been surprisingly found that both the sealant layer and barrier layer are readily oriented together. This is especially surprising since each polymer has unique and different rheological, thermal and morphological properties. The most notable difference is the difference in extensional viscosity or ductility which would cause one to expect that the lower melting sealant layer would be thinned at a different rate from the barrier layer material. It is surprising that the sealant layer, when compression rolled in the multi-layer film of the present invention, readily compression roll orients at the same rate as the intermediate and barrier layers. It has surprisingly been found that the ability to compression orient soft polymers and hard/stiff polymers simultaneously without the softer polymer being displaced disproportionately provides an improved multi-layer film. Further, there is an improved rolling ratio.

The multi-layer film 86 passes through a post-annealing mechanism 90 comprising a plurality of post-annealing rolls 91, 92, 93 and 94. It is to be understood that the number of post-annealing rolls can be varied. Thereafter, in certain embodiments, the film 86 can pass through a corona treatment mechanism 100, chill roll 102, and to a winding section 104. The chill roll 102 removes latent heat in the film 86. When the latent heat is not removed, the film 86 can have stress relief or shrinkage after winding which can crush the core on which the film is wrapped.

The post-annealing of the film provides stress relief and dimensional stability to the film at elevated temperatures. The dimensional stability reflects the film's ability to shrink at elevated temperatures. In preferred embodiments, it is desired to have the temperature on the surfaces of the rolls 91–94 be slightly lower temperature than conventional post-annealing methods such that the sealant layer A does not stick to the annealing rolls. Further, in various embodiments, it has been found to be useful to have larger than standard annealing rolls such that time and temperature can be manipulated to also increase dimensional stability of the multi-layer film. One advantage of time and temperature manipulation is that the high density polyethylene is kept at a higher temperature which provides the multi-layer film with better stress relief.

Figure 6:
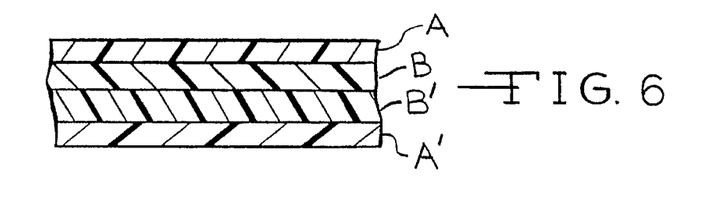
FIG. 6 is a cross-sectional view of a two-layer, two-ply, heat sealable compression rolled film having sealant layers as both outer surfaces of the film.

However, it is to be understood that various other multi-layer films can be produced according to the present invention. It is possible to provide a two-side sealable film in which case the film is not split or separated and inverted. The process can be then shown as in FIG. 1 by not having the two web material 56 pass through the web separating mechanism 60 and the film inverter 70. The material 56 instead directly proceeds from being collapsed at the bubble to compression rolled orienting nip rolls. The tube or bubble is flattened and then fed directly into a compression rolling mill. The combination of heat and pressure produces a two-sided sealable film having a high bond strength between the barrier layers. As shown in FIG. 6, the two-sided sealable film comprises sealant layer A, barrier layer B, a second barrier layer B' and a second sealant layer A'.

Another method within the scope of this invention includes passing the collapsed bubble web 56 of FIG. 1 through the web separator 60 and dividing it into individual webs 62 and 64. The web 62 is not inverted in web inverter 70, rather each web 62 and 64 are further separated and fed into independent compression roll orienting mills, post annealers and the independent winders.

In still another method, one of the webs can be wound onto an intermediate winder (not shown) and retained on the wound roll to be compression roll oriented at a later date or on an independent compression rolled orientation milling machine.

It is to be understood that other coextrusion methods can be utilized to provide a multi-layer film. A multi-layer heat sealable film may be produced by casting a three layer thick film using slot-die film casting technology and compression rolled orienting the resulting film. A single side heat sealable film is produced from a two layer coextrusion system.

Figure 7:
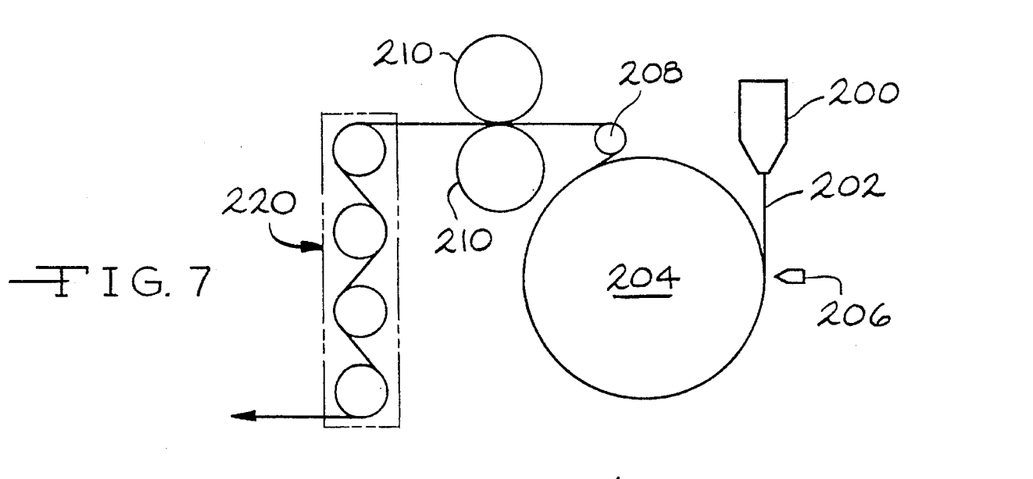
FIG. 7 is a simplified schematic plan view of a coextruded, compression rolled orientation method using a film casting process.
Figure 8:
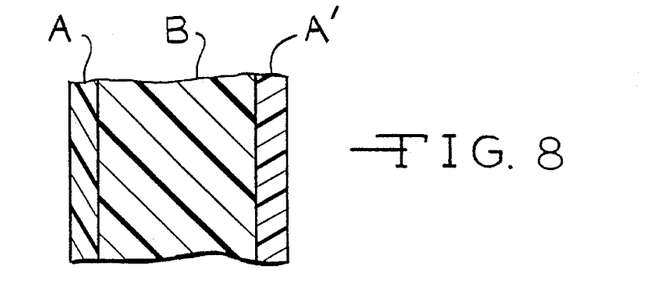
FIG. 8 is a cross-sectional view of a three-layer, single ply, heat sealable compression rolled film having sealant layers as both outer surfaces.
Figure 9:
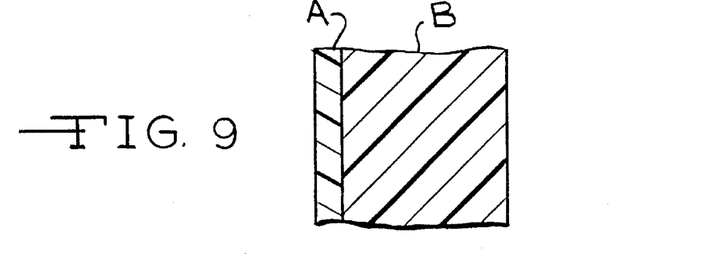
FIG. 9 is a cross-sectional view of a two-layer, single ply, one-side heat sealable compression rolled oriented film.

FIG. 7 shows a film casting which involves extruding molten polymers through a flat die 200 which preferred embodiments have a die gap of about 0.01–0.06 inches and drawing the multi-layer extruded materials down to a thin film 202 from the extrusion die 200 using a large metal casting roll 204. The metal roll 204 may enter a water bath (not shown) to quench the film. The film 202 may be pinned to the casting roll 204 by an air knife 206, vacuum box, electrostatic charge or rubber nip roll. It has been found in preferred embodiments that the best barrier properties are obtained by utilizing relatively low melt temperatures, high casting roll temperatures and no water bath. In preferred embodiments, a stripper roll 208 is utilized to maximize the film contact time on the casting roll 204. The film 202 passes through a compression rolled orientation mechanism 210 and through a post-annealing mechanism 220 as in a manner described above. In embodiments where a rubber nip roll is utilized (not shown), it is desired to have a highly polished smooth surface on the rubber nip roll. FIG. 8 shows a two-side heat sealable compression rolled film having a first sealant layer A, a barrier layer B and second sealant layer A'. An alternative embodiment comprises a one-side heat sealable cast compression roll oriented film as shown in FIG. 9 which comprises an sealant layer A and a barrier layer B.

Yet another casting process can be utilized to form a multi-layer sheet which comprises sheet extrusion technology. This method is useful for producing thick films with higher crystalinity and excellent smooth or high polished surfaces. One example of a sheet extrusion method is generally shown in FIG. 10, wherein a coextrusion die 300 extrudes a sheet 302 material over a plurality of temperature controlled polish rolls 304. In preferred embodiments, there is a controlled gap of about between 75 to about 90% of the nominal sheet thickness, such that the sheet 302 passes over the temperature controlled polish rolls 304. A cooling roll 306 is preferably used adjacent the plurality of polished rolls 304. The multi-layer sheet 302 produced according to this method can be one or two-side heat sealable thick films having thicknesses ranging from 0.006 to about 0.50". The multi-layer sheet 302 passes around a stripper roll 308 which is utilized to maximize the sheet contact time on the cooling roll 306. The sheet 302 passes through a compression rolled orientation mill apparatus 310 and a post-annealing apparatus 320 in a manner as described above. It is contemplated that other coextrusion cast die systems are useful, including ones wherein the various viscosity and flow rate of the polymers can be adjusted. The ability to adopt the process to the differences of various polymers viscosity allows the choice of a great variety of polymers. For example, the Cloeren coextrusion cast die system by the Cloeren Company, which utilizes flow dividers that can be adjusted or moved in response to the various viscosity and flow rates of the polymers flowing beside the flow dividers are useful in the present invention in cast die systems.

FIG. 11 shows a cross-sectional view of a multi-layer sealable barrier film comprising adhesive layers A and A' which have lower melting points than the barrier layers B and B'. The heat and pressure from the compression orienting mills will not melt the barrier layers B and B' of the film, but will cause the sealant layer A' to soften and fuse to the barrier layer B in the middle portion of the film. The intermediate layers M and M' can be any desired material. In one example, the intermediate layers M and M' comprise barrier resin plus trim or the excess width trimmed off the edges of the film and incorporated back into an extruder to save costs. The trim material contains both the barrier material and sealant material which in certain embodiments helps to bond the layers of the film together. The trim is not a requirement for bonding the adhesive layer to the barrier layer, however.

FIG. 12 is a cross-sectional view showing a multi-layer material having an adhesive layer A, barrier layer B and intermediate layers M1, M2 and M3. The multi-layer film shown in FIG. 12 has ten layers. The intermediate layer M1 can be a tie or adhesive layer comprising specialized polymers designed to have an affinity to each of two diverse polymers that have no affinity to each other. An example is the DuPont's Bynel® adhesive material. The tie layer can be used to tie a layer M2 comprising, for example, a gas barrier polymer, including for example nylon or ethylene vinyl alcohol (EVOH) to the barrier or sealant layer. Gas barrier polymers such as nylon and EVOH are polar materials and are hygroscopic. Such polymers absorb water vapor which reduces the gas barrier performance of the film proportionately. The multi-layer film shown in FIG. 12 has two layers of barrier material B and B' on both sides of one of the gas barrier layer M2'. The gas barrier layer M2' remains protected from moisture adsorption and provides more stable gas barrier properties with less loss of gas barrier properties over time and moisture exposure. The M3 layer can be comprised of trim reclaim material from the process which includes both the tie layer material M1 and trim comprising all layers A, B, M1, M2 and M3.

FIG. 13 is a further embodiment showing a multi-layer film having two webs, each comprising an sealant layer A, barrier layer B and four intermediate layers, M1, M2, M3 and M4. It is contemplated that the M1 layer can be a tie material while the layers M2 and M3 can be barrier property materials such as a nylon layer M2 and EVOH layer M3, while the M4 layer can comprise the tie material, trim or scrap material.

In preferred embodiments, the sealant layer comprises about 2.5 to about 80% adhesive layer, based on the layer thickness of the multi-layer film and is preferably about 8 to about 18%, and in certain embodiments about 12.5%. The barrier layer (and intermediate layers together, if present) comprises about 20 to about 97.5% and preferably about 82 to about 92% and in certain embodiments about 87.5%. The total thickness of the compression rolled film ranges from about 0.30 mil to about 4.0 mil and is preferably 0.80 to 1.80 miles. For a single ply film having about 1.4 mil thickness, the sealant layer preferably ranges from about 0.035 to about 1.12 mil and preferably about 0.175 mil while the barrier layer ranges from about 0.28 to about 1.365 mil and preferably about 1.225 mil.

Blown coextruded, compression rolled films may be single or two-ply multi-layer structures. The following layer ratio and layer thickness, based on a 1.40 mil. preferred thickness are as shown in Table 1 below.

TABLE 1

| Film Layer | Range | Preferred | Example |
|---|---|---|---|
| Blown Input Film | | | |
| Oriented Single Ply, Two-Layer Thickness Ratio (%) | | | |
| A | 5–80 | 8–18 | 12.5 |
| B | 20–95 | 82–92 | 87.5 |
| Oriented, 1.40 Mil, Single Ply, Two-Layer Film Layer Thicknesses (Mil) | | | |
| A | 0.07–1.12 | 0.112–0.252 | 0.175 |
| B | 0.28–1.33 | 1.148–1.288 | 1.225 |
| Oriented Two-Ply, Two-Layer Thickness Ratio (%) | | | |
| A | 2.5–40 | 8–18 | 12.5 |
| B | 10.–47.5 | 32–42 | 37.5 |
| A' | 2.5–40 | 8–18 | 12.5 |
| B' | 10.–47.5 | 32–42 | 37.5 |
| 1.40 Mil, Two-Ply, Four-Layer Film Layer Thicknesses (Mil) | | | |
| A | 0.035–0.560 | 0.112–0.252 | 0.175 |
| B | 0.140–0.665 | 0.448–0.588 | 0.525 |
| A' | 0.035–0.560 | 0.112–0.252 | 0.175 |
| B' | 0.140–0.665 | 0.448–0.588 | 0.525 |

Table 2 below shows for oriented single ply, multi-layer cast films, the layer ratio, the percentage and film thickness for the preferred ranges and one example. The thicknesses are based on a 1.4 mil thick film.

TABLE 2

| Film Layer | Range | Preferred | Example |
|---|---|---|---|
| Cast Input Film | | | |
| Oriented, Single Ply, Two-Layer Thickness Ratio | | | |
| A | 2.5–80 | 6–20 | 12.5 |
| B | 20–97.5 | 80–94 | 87.5 |
| Oriented, 1.40 Mil, Single Ply, Two-Layer Film Layer Thicknesses (Mil) | | | |
| A | 0.035–1.120 | 0.084–0.280 | 0.175 |
| B | 0.280–1.365 | 1.120–1.316 | 1.225 |

Table 3 below shows a blown film with trim reclaim as a middle layer. It is to be understood that the middle layer can contain trim alone, trim and barrier layer material, or trim and a polymer of choice and an inorganic filler of choice for achieving such additional desirable properties as opacity, puncture strength, and/or tear strength. This description is for a two-ply, three-layer coextrusion, compression rolled together as shown in FIG. 11.

TABLE 3

| Film Layer | Range | Preferred | Multi-Layer Film Example |
|---|---|---|---|
| One-Side Heat Sealable Compression Rolled Film 3-Layer Coextrusion, 2-Ply Construction | | | |
| B' | 5–20 | 7.5–15 | 12.5 |
| M' | 10–40 | 20–30 | 25.0 |
| A' | 5–20 | 7.5–15 | 12.5 |
| B | 5–20 | 7.5–15 | 25.0 |
| M | 10–40 | 20–30 | 25.0 |
| A | 5–20 | 7.5–15 | 12.5 |
| | | | 100.0% |

The data in Table 4 below demonstrates superior barrier properties in a coextruded compression roll oriented heat sealable barrier film of the present invention as compared to other films. The first three examples show the prior technology of monolayer high density polyethylene (HDPE) films having moisture vapor transmission rates ranging from about 0.10 to about 0.12 using a compression rolled orientation process.

The next three examples show a coextruded high density polyethylene/sealant film produced by Mobil Corporation's OHD process having moisture vapor transmission rates of about 0.34. The Mobil OHD process stretches the film in a machine direction using two sets of nip rolls. The second set of nip rolls is set at a higher speed than the first set, such that the film is stretched in between the first and second rolls. The film is then stretched in a transverse direction using a tentering methodology.

The next two examples show monolayer and coextruded layers of polypropylene which were biaxially tentered, as shown by the Hercules B500 film and the Borden OPPtiwrapt™CD442 films. The moisture vapor transmission rates were 0.30 and 0.35, respectively.

The next example shows a coextruded high density polyethylene/sealant film, which was blown with no orientation process, having a moisture vapor transmission rate was about 0.34.

In comparison, the coextruded high density polyethylene barrier film/sealant layer which was compression roll oriented according to the present invention had a moisture vapor transmission rate of about 0.16. It is important to note that the difference in moisture vapor transmission rates between 0.16 and 0.23 is of great significance to those in the industry. A package designer who wants a barrier property of about 0.10 MVTR must utilize a Mobil OHD film having a thickness of about 2.3 mils. However, the package designer can utilize the coextruded barrier/sealant film compression roll oriented according to the present invention having a thickness of about 1.6 mil. This is a significant difference when the package designer must produce millions of packages. The savings of about 0.7 mil difference becomes significant while the MVTR performance criteria are still met.

TABLE 4

COMPARATIVE MVTR DATA OR ORIENTED HDPE's

| Film Type | Orient. Process | MVTR | Data Source |
|---|---|---|---|
| Monolayer HDPE | CRO | .10 | GB 980,260 |
| Monolayer HDPE | CRO | .11 | U.S. Pat. No. 3,508,843 |
| Monolayer HDPE | CRO | .12 | Data* |
| Coex HDPE/ Sealant | Mobil's OHD** | .23 | U.S. Pat. No. 4,870,122 Table I |
| Coex HDPE/ Sealant | Mobil's OHD** | .23 | Data* |
| Coex HDPE/ Sealant | Mobil's OHD** | .23 | U.S. Pat. No. 4,916,025 |
| Monolayer PP | Biax Tenter | .30 | Hercules B500 Film |
| Coex PP | Biax Tenter | .35 | Borden OPPtiwrap ™ CD442 |
| Coex HDPE/ Sealant (Blown) | None | .34 | Data* |
| Coex HDPE/ Sealant | CRO | .16 | Data* |

TABLE 4-continued

COMPARATIVE MVTR DATA OR ORIENTED HDPE's

| Film Type | Orient. Process | MVTR | Data Source |
|---|---|---|---|

*All data were produced on a Mocon W600 MVTR unit, based on ASTM F-1249 test method and reported in a per mil value in g/100 sq. in./24 Hr. @ 100° F. & 90% RH.
**Mobil's OHD process stretches the film MD via two sets of nip rolls, the second set at a higher speed than the first, and TD via tentering methodology.

The present invention has been described in detail by reference to a preferred embodiment. However, it is apparent that modifications and variations are possible without departing from the scope of the invention defined in the appended claims. Several changes or modifications have been briefly mentioned for purposes of illustration.

I claim:

1. A multi-layer heat sealable barrier film, the film being produced by coextrusion and compression rolled orientation of at least one barrier layer of moisture resistant thermoplastic material with at least one sealant layer of a heat sealable thermoplastic material the film comprising about 2.5 to about 80% sealant material and about 20 to about 97.5% barrier material, based on the thickness of the film, the film having an average moisture vapor transmission rate less than about 0.2 grams/100 square inches per day at 100° F. and 90% relative humidity per mil of thickness.

2. The film of claim 1, wherein the barrier layer comprises a material selected from the group comprising high density polyethylene, medium density polyethylene, low density polyethylene, linear polyethylene, polypropylene, nylon, ethylene vinyl, alconol, polyester, polyacrylonitrile, polyvinylidene chloride and blends thereof.

3. The film of claim 1, wherein the sealant layer comprises a material selected from the group comprising ethylene vinyl acetate copolymer, ethylene methyl acrylate copolymer, butene, hexene and octene copolymers of polyethylene, ethylene acrylic acid copolymer, ethylene methacrylic acid copolymers, hexene-butene copolymers, ionomers, acid or anhydride modified ethylene vinyl acetate copolymers, medium density polyethylene, low density polyethylene, ultra low density polyethylene, very low density polyethylene, metallocene catalyst based polyethylenes containing comonomers of butene, hexene, or octene and blends thereof.

4. The film of claim 1 further comprising at least one intermediate layer positioned between at least one sealant layer and at least one barrier layer.

5. The film of claim 4, wherein at least one intermediate layer is positioned between a first sealant layer and a first barrier layer and at least one intermediate layer is positioned between a second sealant layer and a second barrier layer.

6. The film of claim 4, wherein the intermediate layer comprises scrap or excess multi-layer film.

7. The film of claim 4, wherein at least one intermediate layer comprises a gas barrier material.

8. The film of claim 4, comprising two webs, each web comprising a first intermediate layer comprising an adhesive material which binds a sealant layer to a second intermediate layer comprising a gas impervious material, a third intermediate layer comprising an adhesive material which binds the second intermediate layer to a barrier layer.

9. The film of claim 4, wherein at least one layer includes a pigment material in an amount sufficient to control the opacity or color of the film.

10. The film of claim 1, wherein the sealant layer comprises about 8 to about 18% and the barrier layer comprises about 82 to about 92%, based on the thickness of the film.

11. The film of claim 1, wherein the thickness of the sealant layer ranges from about 0.035 to about 1.120 mil and the thickness of the barrier layer ranges from about 0.280 to about 1.365 mil, based on a film thickness of about 1.4 mil.

12. The film of claim 1, wherein the film thickness ranges from about 0.3 mil to about 4.0 mil.

13. The film of claim 1 having a thickness of about 0.75 to about 2.00 mil.

14. The film of the claim 1 having a thickness of about 1.00 to about 1.6 mil.

15. The film of claim 1, wherein the sealant layer has a thickness of about 0.07 to about 1.12 mil and the barrier layer has a thickness of about 0.28 to about 1.33 mil.

16. The film of claim 1, wherein at least one layer includes a material in an amount sufficient to control the opacity or color of the film.

17. A multi-layer two-side heat sealable barrier film, the film being produced by coextrusion and compression roll orientation, comprising a first sealant layer, a first barrier layer, a second barrier layer adjacent the first barrier layer, and a second sealant layer adjacent the second barrier layer, the layers being welded together by compression rolled orientation of the film.

18. A multi-layer one-side heat sealable barrier film, the film being produced by coextrusion and compression rolled orientation, comprising a first sealant layer, a first barrier layer, a second sealant layer adjacent the first barrier layer, and a second barrier layer adjacent the second sealant layer, the layers being bonded together by compression rolled orientation.

19. The film of claim 18, wherein the first sealant layer has a thickness of about 0.035 to about 0.560 mil; the first barrier layer has a thickness of about 0.140 to about 0.665 mil.; the second sealant layer has a thickness of about 0.035 to about 0.560 mil; and, the second barrier layer has a thickness of about 0.140 to about 0.665 mil.

20. The film of claim 19, wherein the first sealant layer has a thickness of about 0.112 to about 0.252 mil; the first barrier layer has a thickness of about 0.448 to about 0.588 mil; the second sealant layer has the thickness of about 0.448 to about 0.558 mil; and, the second barrier layer has a thickness of about 0.112 to about 0.252 mil.

21. The film of claim 18, wherein the first or second barrier layer comprises a material selected from the group comprising high density polyethylene, medium density polyethylene, low density polyethylene, linear polyethylene, polypropylene, nylon, ethylene vinyl alcohol, polyester, polyacrylonitrile, polyvinylidene chloride and blends thereof.

22. The film of claim 18, wherein the first or second sealant layer comprises a material selected from the group comprising ethylene vinyl acetate copolymer, ethylene methyl acrylate copolymer, butene, hexene and octene copolymers of polyethylene, ethylene acrylic acid copolymer, ethylene methacrylic acid copolymers, hexene-butene copolymers, ionomers, acid or anhydride modified ethylene copolymers, medium density polyethylene, low density polyethylene, ultra low density polyethylene, very low density polyethylene, metallocene catalyst based polyethylenes containing comonomers of butene, hexene, or octene and blends thereof.

23. The film of claim 18 having an average moisture vapor transmission rate less than about 0.2 grams/100 square inches per day at 100° F. and 90% relative humidity per mil of thickness.

24. The multi-layer heat sealable barrier film of claim 18, the film produced by coextrusion and compression rolled orientation, comprising about 2.5 to about 80% of the sealant layers and about 20 to about 97.5% of the barrier layers, based on the thickness of the film.

25. The film of claim 24, wherein the sealant layers comprise about 8 to about 18% and the barrier layers comprise about 82 to about 92%, based on the thickness of the film.

26. The film of claim 24, wherein the thickness of the sealant layers range from about 0.035 to about 1.120 mil and the thickness of the barrier layers range from about 0.280 to about 1.365 mil, based on a film thickness of about 1.4 mil.

27. The multi-layer heat sealable barrier film of claim 18, the film produced by coextrusion and compression rolled orientation, comprising by percent based on the thickness of the film: about 2.5 to about 40% first sealant layer; about 10 to about 47.5% first barrier layer; about 2.5 to about 40% second sealant layer; and, about 10 to about 47.5% second barrier layer.

28. The film of claim 27, wherein the first sealant layer comprises about 8 to about 18%; the first barrier layer comprises about 32 to about 42%; the second sealant layer comprises about 8 to about 18%; and, the second barrier layer comprises about 32 to about 42%, based on the thickness of the film.

29. The film of claim 18, wherein the film thickness ranges from about 0.3 mil to about 4.0 mil.

30. The film of claim 18, having a thickness of about 0.75 to about 2.00 mil.

31. The film of the claim 18, having a thickness of about 1.00 to about 1.6 mil.

32. The film of claim 18, wherein the sealant layers have a thickness of about 0.07 to about 1.12 mil and the barrier layers have a thickness of about 0.28 to about 1.33 mil.

33. The film of claim 18, wherein at least one layer includes a material in an amount sufficient to control the opacity or color of the film.

34. A multi-layer two-side heat sealable barrier film, the film being produced by coextrusion and compression rolled orientation, comprising a first layer of a barrier material and second and third layers comprising sealant material on opposing surfaces of said first barrier layer.

35. A multi-layer heat sealable barrier film, the film produced by coextrusion and compression rolled orientation, comprising by percent based on the thickness of the film: about 2.5 to about 40% first sealant layer; about 10 to about 47.5% first barrier layer; about 2.5 to about 40% second sealant layer; and, about 10 to about 47.5% second barrier layer.

36. The film of claim 35, wherein the first sealant layer comprises about 8 to about 18%; the first barrier layer comprises about 32 to about 42%; the second sealant layer comprises about 8 to about 18%; and, the second barrier layer comprises about 32 to about 42%, based on the thickness of the film.

37. A multi-layer heat sealable barrier film, the film produced by coextrusion and compression rolled orientation, comprising by percent based on thickness of the film: a first barrier layer comprising about 5 to about 20%; a first intermediate layer comprising about 10 to about 40%; a first sealant layer comprising about 5 to about 20%; a second barrier layer comprising about 5 to about 20%; a second intermediate layer comprising about 10 to about 40%; and, a second sealant layer comprising about 5 to about 20%.

38. The film of claim 37, wherein the first barrier layer comprises about 7.5 to about 15%; the first intermediate layer comprises about 20 to about 30%; the first sealant layer comprising about 7.5 to about 15%; the second barrier layer comprising about 7.5 to about 15%; the second intermediate layer comprising about 20 to about 30%; and, the second sealant layer comprising about 7.5 to about 15%, based on thickness of the film.

39. The film of claim 37, wherein at least one layer includes a material in an amount sufficient to control the opacity or color of the film.

40. The film of claim 37, wherein the first barrier layer has a thickness of about 0.070 to about 0.280; the first intermediate layer has a thickness of 0.140 to 0.560 mil; the first sealant layer has a thickness of 0.070 to about 0.280 mil; the second barrier layer has a thickness of 0.070 to 0.280 mil; the second intermediate layer has a thickness of 0.140 to 0.560 mil, and the second sealant layer has a thickness of 0.070–0.280 mil.

41. The film of claim 37, wherein the total film thickness ranges from about 0.3 mil to 4.0 mil.

* * * * *